US011670933B2

(12) United States Patent
Shen et al.

(10) Patent No.: US 11,670,933 B2
(45) Date of Patent: Jun. 6, 2023

(54) DIRECT CURRENT MOMENTARY CIRCUIT INTERRUPTER

(71) Applicants: Zheng John Shen, Chicago, IL (US); Yuanfeng Zhou, Chicago, IL (US); Risha Na, Chicago, IL (US)

(72) Inventors: Zheng John Shen, Chicago, IL (US); Yuanfeng Zhou, Chicago, IL (US); Risha Na, Chicago, IL (US)

(73) Assignee: ILLINOIS INSTITUTE OF TECHNOLOGY, Chicago, IL (US)

( * ) Notice: Subject to any disclaimer, the term of this patent is extended or adjusted under 35 U.S.C. 154(b) by 0 days.

(21) Appl. No.: 17/501,175

(22) Filed: Oct. 14, 2021

(65) Prior Publication Data

US 2022/0123544 A1 Apr. 21, 2022

Related U.S. Application Data

(60) Provisional application No. 63/092,130, filed on Oct. 15, 2020.

(51) Int. Cl.
*H02H 3/087* (2006.01)
*H01H 33/59* (2006.01)
*H02H 1/00* (2006.01)

(52) U.S. Cl.
CPC .......... *H02H 3/087* (2013.01); *H01H 33/596* (2013.01); *H02H 1/0007* (2013.01)

(58) Field of Classification Search
CPC ....... H02H 3/087; H02H 3/021; H01H 33/596
See application file for complete search history.

(56) References Cited

U.S. PATENT DOCUMENTS

| 8,717,716 B2 | 5/2014 | Häfner et al. |
| 2009/0302686 A1* | 12/2009 | Fishman ............... H02M 7/493 307/82 |

(Continued)

OTHER PUBLICATIONS

Callavik, et al., "ABB's Hybrid HVDC Breaker, An Innovation Breakthrough Enabling Reliabel HVDC Grids," ABB Review—Technical Paper, Feb. 2012, (10 pp.).

*Primary Examiner* — Jared Fureman
*Assistant Examiner* — Christopher J Clark
(74) *Attorney, Agent, or Firm* — Pauley Erickson & Swanson

(57) ABSTRACT

A momentary circuit interrupter in series connection with a mechanical switch to provide protection against short circuit faults in a DC power circuit. The momentary circuit interrupter injects a transient voltage pulse via a pulse transformer to reduce a DC fault current to near zero in a DC circuit branch, thus allowing the mechanical switch to disconnect the faulty branch under a near zero-current condition. The power electronic circuit on the primary side of the transformer controls the discharge of a plurality of pre-charged capacitors to generate the transient voltage pulse during the fault interruption process, but otherwise does not incur any power loss during normal operation. The secondary winding of the pulse transformer conducts the main DC current, and is highly conductive to minimize the conduction power loss. The invention provides ultrafast response to a short circuit fault (even faster than solid-state circuit breakers and much faster than hybrid circuit breakers), significantly reduced overcurrent stress in the power system, and/or ultralow conduction power losses.

20 Claims, 12 Drawing Sheets

(56) References Cited

U.S. PATENT DOCUMENTS

| | | | |
|---|---|---|---|
| 2016/0156175 A1* | 6/2016 | Koshizuka | H02H 9/02 |
| | | | 361/93.9 |
| 2016/0190791 A1* | 6/2016 | Sim | H01H 9/541 |
| | | | 361/93.6 |
| 2019/0057825 A1* | 2/2019 | Rupp | H01H 9/542 |

* cited by examiner

DIRECT CURRENT MOMENTARY CIRCUIT INTERRUPTER

CROSS REFERENCE TO RELATED APPLICATION

This application claims the benefit of U.S. Provisional Patent Application, Ser. No. 63/092,130, filed on 15 Oct. 2020. The co-pending provisional application is hereby incorporated by reference herein in its entirety and is made a part hereof, including but not limited to those portions which specifically appear hereinafter.

GOVERNMENT SUPPORT CLAUSE

This invention was made with government support under Contract Number DE-AR0001463 awarded by the Department of Energy (ARPA-E). The government has certain rights in the invention.

FIELD OF THE INVENTION

This invention relates generally to circuit protection and circuit interruption devices in power distribution or transmission systems. More particularly, the invention provides to a momentary circuit interrupter that can quickly reduce a DC fault current to near zero and allow a series-connected mechanical switch to disconnect the faulty branch.

BACKGROUND OF THE INVENTION

DC power systems are gaining tractions in recent years because they offer higher efficiency and power capacity. However, protecting these DC power systems against short circuit faults remains a major technical challenge. Traditional electromechanical circuit breakers are generally incapable of reliably interrupting a DC fault current because of lack of zero crossings in DC power circuits. Solid-state circuit breakers (SSCB) can quickly interrupt DC fault current within tens of microseconds but suffer from high conduction losses. The response time of an SSCB is mostly determined by the time that the metal-oxide-varistor (MOV) takes to dissipate the residual system electromagnetic energy rather than by the turnoff speed of the power semiconductor switching devices. Hybrid circuit breakers (HCB) offer a very low conduction loss but only a moderate response time of 1-20 milliseconds (10-100 times slower than SSCB). The response time of an HCB is determined by both the opening speed of the main mechanical switch and the MOV energy dissipation time. The HCB response time is often too long for many DC power systems with a low loop impedance, such as the future turboelectric aircraft or electric ships. In addition, both the SSCB and HCB solutions generally require a series-connected mechanical disconnect switch to provide galvanic isolation after the circuit breaker interrupts the fault current. The entire fault interruption/isolation process usually takes tens of milliseconds. It is therefore highly advantageous to develop a new circuit protection architecture which offers both low conduction loss and microsecond-range interruption time, that is, combining the best features of both the SSCB and HCB solutions.

The most distinct advantage of the prior art SSCBs is the fast switching of the power semiconductor devices during infrequent fault interruption operation while the most distinct disadvantage is the continuous flow of current through the same semiconduction devices during normal operation. It would be highly desirable to use the fast switching property of the semiconductor devices in the new circuit protection architecture during fault interruption but avoid running current therethrough during normal operation.

Prior art HCBs are of parallel nature (although the word "parallel" is not explicitly used), in which an electronic path is connected in parallel with the main mechanical switch. The fault current in the mechanical switch is initially commutated to the electronic path to create current zero crossings in various forms to aid the opening of the mechanical switch. The electronic path will then be interrupted without arcing afterwards. The most distinct disadvantage of these parallel HCBs is the relatively long opening time of the mechanical switch (e.g., hundreds to thousands of microseconds), during which the fault current continues to rise through the electronic path and oftentimes reaching an unacceptable level for many power applications. It would be highly desirable to curtail the fault current while the mechanical switch is being opened.

SUMMARY OF THE INVENTION

The invention provides a circuit protection apparatus and method for interrupting a direct-current (DC) fault current, and preferably isolating the fault from the DC power system. A momentary circuit interrupter is used for reducing a DC fault current to near zero within a specified response time upon detection of a fault current state in the circuit, and a mechanical switch in series connection with said momentary circuit interrupter (and the circuit load) can be used to further isolate the fault. The apparatus of this invention provides efficient response times, such as between about 5 microseconds and about 1000 microseconds, preferably between about 5 microseconds and 500 microseconds, and desirably about 5 microseconds and about 100 microseconds.

The invention includes a circuit protection apparatus for interrupting a direct-current (DC) fault current in a DC power system. The circuit protection apparatus included a momentary circuit interrupter with a plurality of capacitors and operable in combination with a DC circuit branch of the DC power system to reduce a DC fault current to a near zero-current condition upon a fault current state in the DC circuit branch. The momentary circuit interrupter further includes a pulse transformer connectable to the DC circuit branch and operable to inject a transient voltage from the capacitors to the DC circuit branch to reduce the DC fault current to the near zero-current condition.

The invention further includes a circuit protection apparatus for interrupting a direct-current (DC) fault current in a DC power system, which includes a momentary circuit interrupter operable in combination with a DC circuit branch of the DC power system to reduce a DC fault current to a near zero-current condition upon a fault current state in the DC circuit branch, and a mechanical switch in series connection with the momentary circuit interrupter. The mechanical switch is operable to open the circuit under the near zero-current condition to interrupt the fault current and isolate the DC circuit branch.

Embodiments of this invention provide a circuit protection scheme including the momentary circuit interrupter (MCI) in series connection with a mechanical switch. The MCI can quickly (e.g., within several microseconds) reduce a DC fault current to, and hold it near, zero for a certain period of time (e.g., hundreds of microseconds) while the series-connected mechanical switch can be safely opened to disconnect the faulty branch. Advantages of this invention include microsecond-range of fault current reduction and low on-state power losses.

The present invention includes a momentary circuit interrupter in series connection with a mechanical switch to provide protection against short circuit faults in a DC power circuit. This invention includes: a momentary circuit interrupter (MCI) that can quickly inject a transient voltage pulse via a pulse transformer and reduce a DC fault current to near zero in a DC circuit branch, thus allow a series-connected mechanical switch to disconnect the faulty branch under a near zero-current condition. The power electronic circuit on the primary side of the transformer controls the discharge of a plurality of pre-charged capacitors to generate the transient voltage pulse during the fault interruption process (e.g., a period of 5-1000 microseconds), but otherwise does not incur any power loss during normal operation. The secondary winding of the transformer carries the main DC current, and must be highly conductive to minimize the conduction power loss. In some embodiments, high-temperature superconducting (HTS) wires or tapes are used for this purpose. The MCI is not a circuit breaker in the traditional sense, and is not capable of blocking a steady-state voltage. It is only operable to force the fault current to ramp down to and hold near zero for a limited period of time (e.g., 5-1000 microseconds).

The invention includes embodiments which may be designed for unidirectional or bidirectional current flows. In all embodiments, one or more semiconductor switches such as silicon or silicon carbide insulated-gate bipolar transistors (IGBTs), thyristors, power MOSFETs, diodes, and other electronic components such as capacitors are used to control the current going through the secondary coil of the pulse transformer in a switching mode, which is the load current of the main power circuit.

The details of one or more embodiments of the invention are set forth in the accompanying drawings and the descriptions below. Other features, aspects, and advantages of the invention will become apparent from the description, the drawings, and the claims.

DETAILED DESCRIPTION OF THE INVENTION

The invention provides a momentary circuit interrupter for use in interrupting short circuit faults in DC power circuits. The momentary circuit interrupter can be further used in series connection with a mechanical switch to interrupt and isolate short circuit faults in DC power circuits. Embodiments of the invention can be further understood in the following detailed descriptions.

Figure 1:
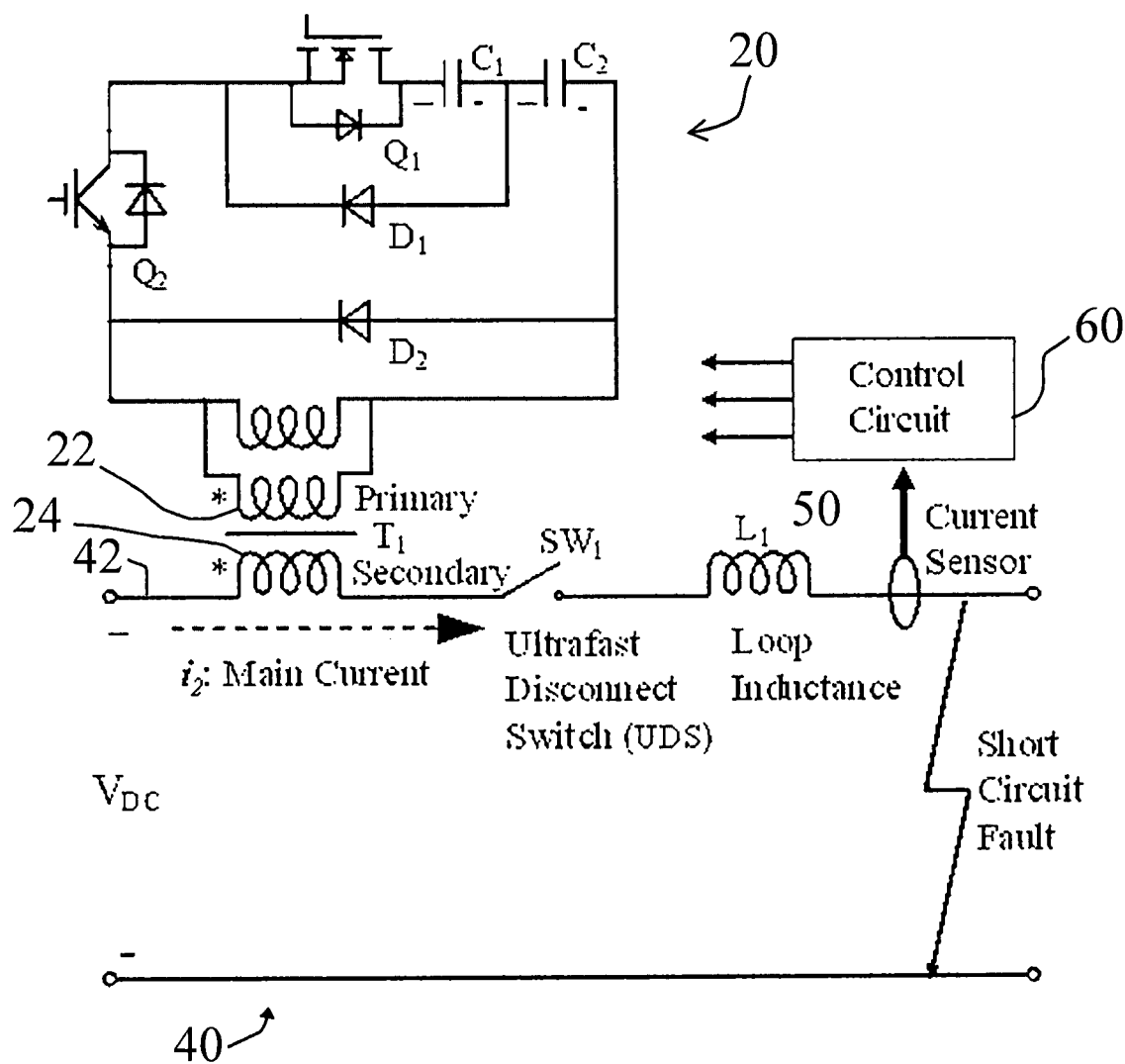
FIG. 1 illustrates a circuit protection architecture according to one embodiment of this invention.

FIG. 1 illustrates a circuit protection architecture according to embodiments of this invention. FIG. 1 shows a momentary circuit interrupter (MCI) 20, and more specifically a unidirectional momentary circuit interrupter, connected to a DC power circuit 40. The MCI 20 includes two capacitors C1 and C2 for providing transient voltage to the circuit 40 according to the fault interruption methods of this invention. A pulse transformer T1 connects the MCI 20 to the circuit 40. The pulse transformer T1 includes a primary winding 22 connected to a power electronic circuit of the momentary circuit interrupter 20 and a secondary winding 24 connected in series with the DC circuit branch 42. The load current of the circuit 40 flows through just the secondary winding 24 of the transformer T1. The transformer T1 is connected in series with a mechanical switch SW1. The loop inductance L1 of the main power branch L1 is also shown in FIG. 1. Note that the magnetizing inductance is included in the transformer model but the leakage inductances are not for the sake of simplicity.

Two transistors Q1 and Q2 are used to connect and/or control the capacitors C1 and C2 with respect to the pulse transformer T1. Diodes D1 and D2 are also incorporated to conduct the current and complete the full circuit. When an overcurrent condition is detected by any suitable current sensor 50, the MCI 20 is activated, via control circuit 60, by actuating Q2 and/or Q1 to discharge the pre-charged capacitors C1 and C2, and quickly inject a transient high-voltage pulse via the transformer T1. This transient voltage pulse is designed to exceed the DC supply voltage in the main circuit loop and will force the DC fault current to zero within a very short time (e.g., 100 µs or less, preferably 10 µs or less).

In embodiments of this invention, Q1 turns on and off in a PWM mode to alternately apply a higher voltage (C1 and C2 in series) or a lower voltage (C2 only via diode D1) across the primary winding 22 of the transformer T1. This PWM switching of Q1 causes the T1 secondary voltage to fluctuate around the DC power supply voltage and therefore holds the fault current to a near-zero small AC ripple current during the next 50-500 microseconds. As used herein "near-zero" preferably refers to ≤±5% of the nominal DC current.

In embodiments of this invention, the momentary circuit interrupter is paired with a switch in the DC circuit, such as the mechanical switch SW1 in the circuit branch 42 in FIG. 1. This series mechanical switch SW1 (e.g., an ultrafast disconnect switch) opens under a near zero-current and/or zero-voltage condition, and galvanically isolates the faulty branch, preferably within 100-500 microseconds. The switch can also be controlled by the control circuit 60.

The following Table 1 summarizes exemplary electrical parameters used for a design example according to FIG. 1, and described below with reference to FIGS. 2-3.

TABLE 1

| Parameter | Value (example) | Notes |
| --- | --- | --- |
| System DC voltage | 10,000 V | DC power supply voltage |
| Nominal DC current | 100 A | Nominal load current |
| System loop inductance L1 | 40 µH | Parasitic or intentional |
| Transformer turn ratio | 4-6 | Secondary to primary ratio |
| Transformer inductance | 150 µH (primary) | Magnetizing inductance |
| C1 capacitance/voltage | 640 µF/800 V | 900 V-rated capacitor |
| C2 capacitance/voltage | 400 µF/2500 V | 2700 V-rated or in series |
| Q1 | 1.2 kV/500 A IGBT | PWM switching at 800 V |
| Q2 | 4.5 kV/500 A IGBT | ON/OFF once |
| D1 | 1.2 kV/500 A diode | Freewheeling diode for Q1 |
| D2 | 4.5 kV/500 A diode | Freewheeling diode for Q2 |

Figure 2:
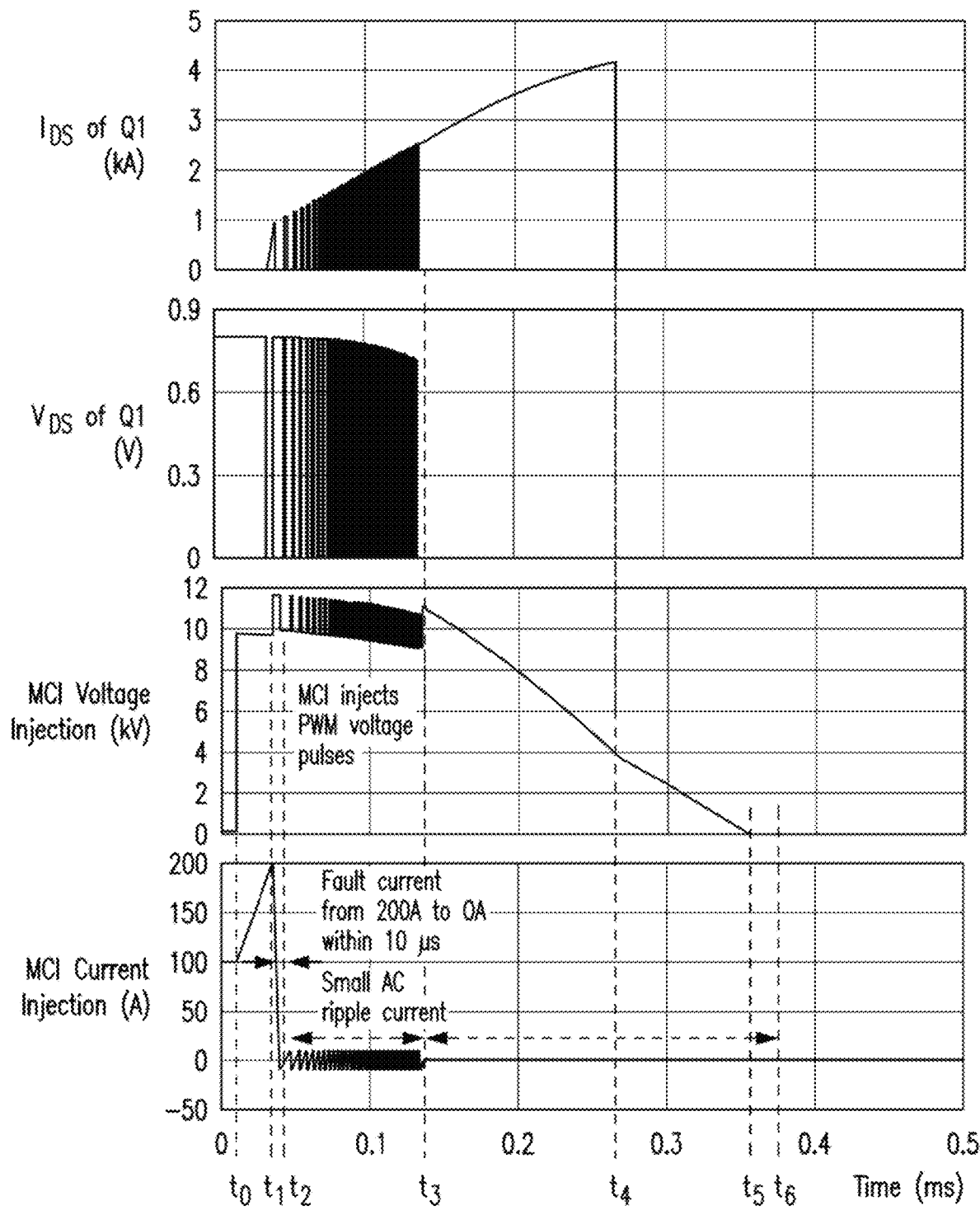
FIG. 2 illustrates operation waveforms of an exemplary embodiment of this invention based upon FIG. 1.
Figure 3A:
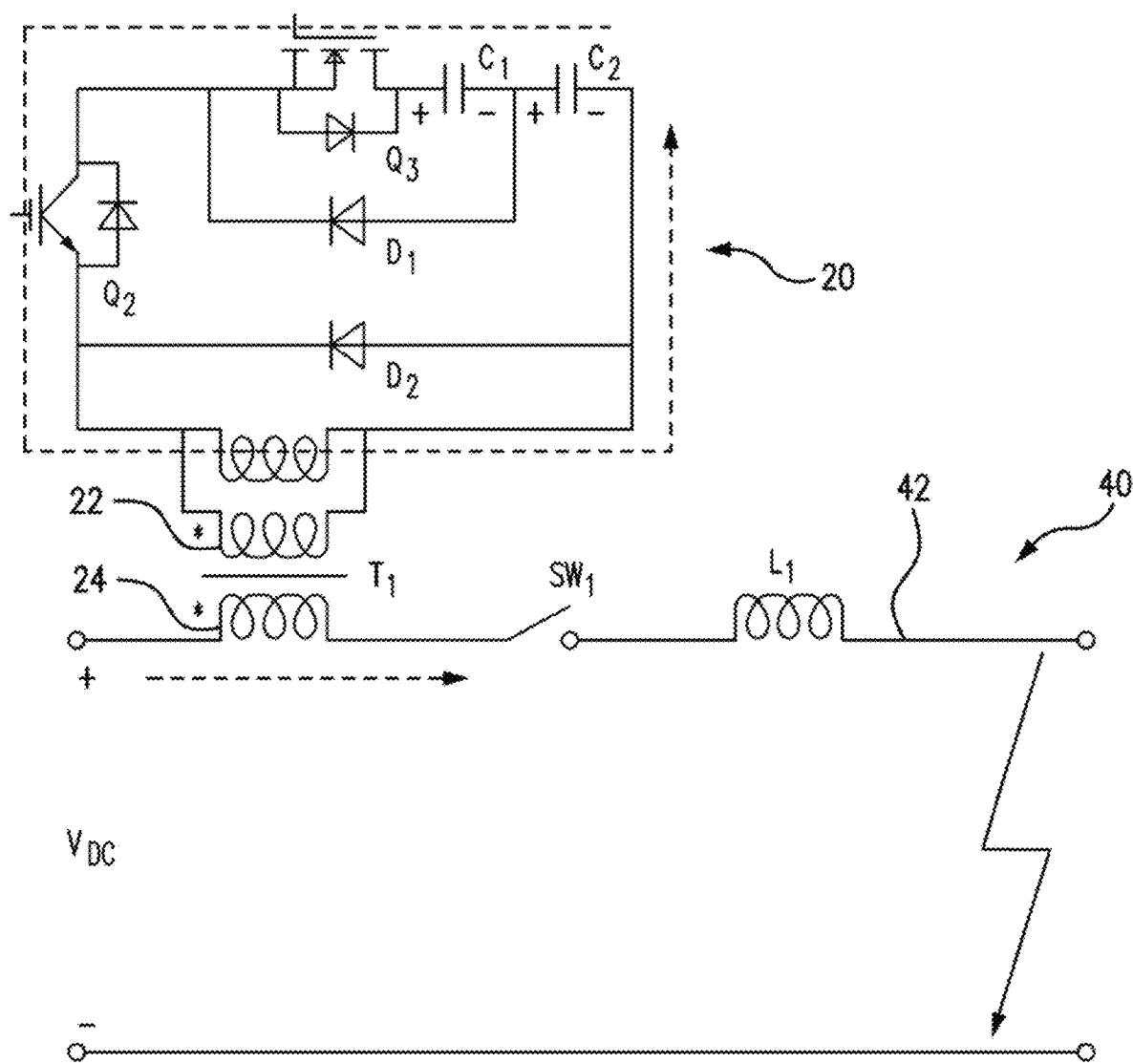
FIGS. 3A-C illustrate current flows in different operation modes of the exemplary embodiment of FIG. 2.
Figure 3B:
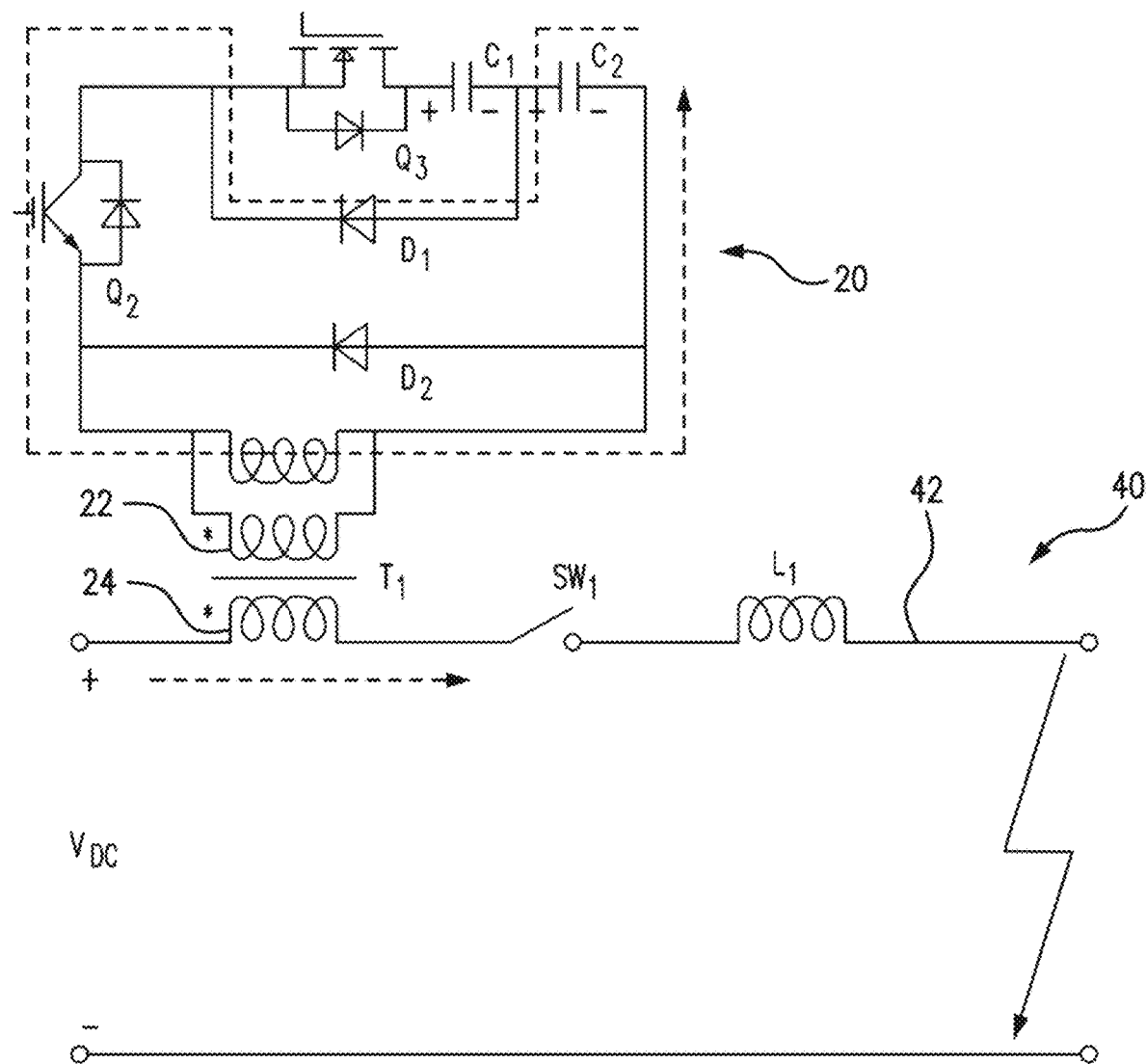
Figure 3C:
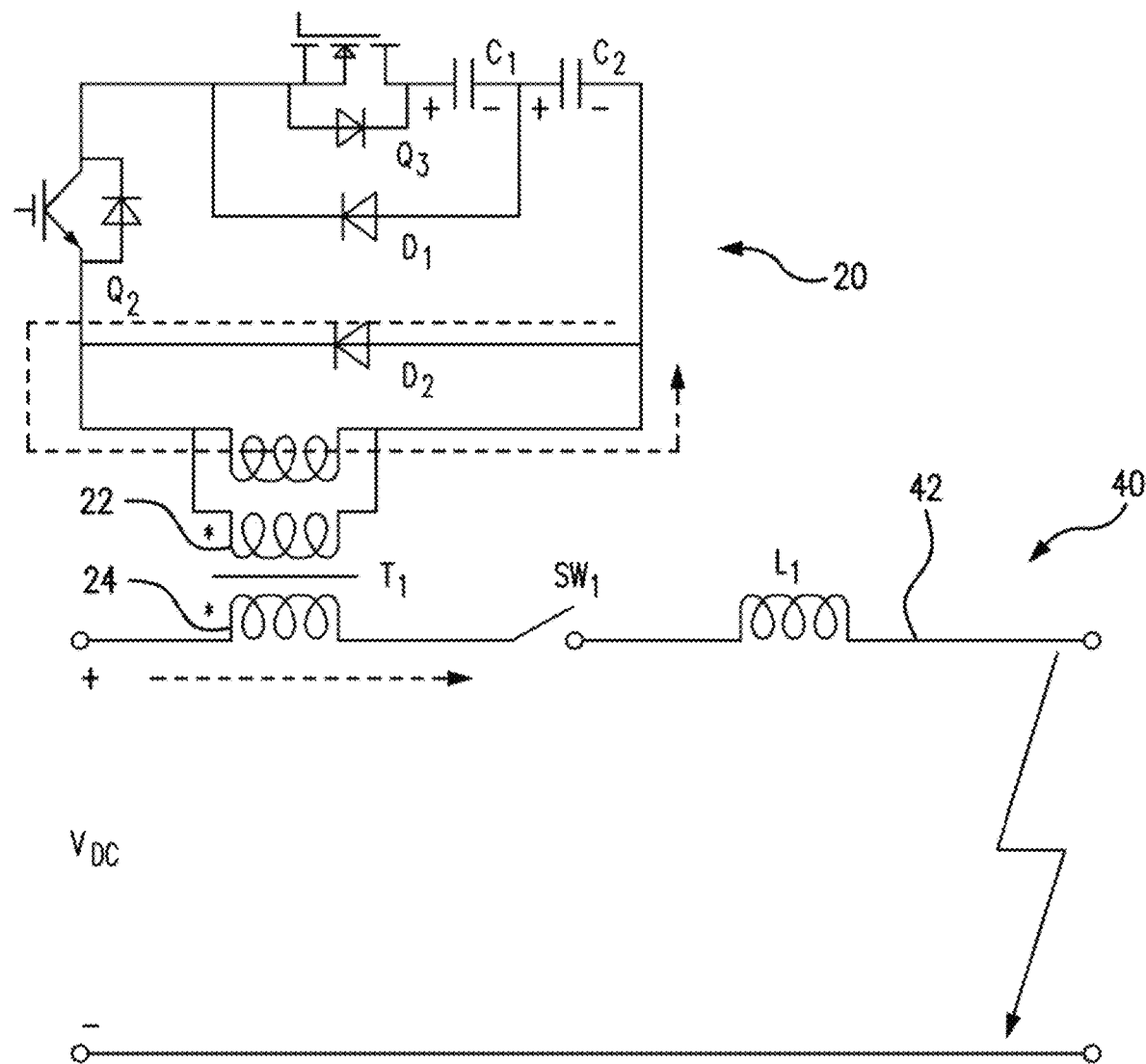

FIG. 2 illustrates operating waveforms and FIGS. 3A-C show three operation modes of the unidirectional MCI 20 shown in FIG. 1. Prior to $t_0$, a nominal current of 100 A flows from the DC power supply (left) to the load (right) in the main circuit loop 40, and the MCI 20 is inactive with C1 and C2 already pre-charged to 800V and 2,500V, respectively. The load current is also the secondary winding 24 current of the transformer T1. At $t_0$, a short circuit fault occurs and the fault current increases rapidly. The self-inductance of the transformer T1 produces a high counter transient voltage slightly below the DC supply voltage and effectively limits the rate of increase of the fault current. At $t_1$, a fault current of 200 A (i.e., 2× nominal current) is detected and the MCI 20 is then activated by turning on Q1 and Q2 to discharge C1 and C2. The MCI 20, now operating in the mode of FIG. 3A, suddenly drops a stepping voltage of approximately 3,300V (the total voltage of C1 and C2 in series) across the primary winding 22 of the transformer T1, subsequently inducing a transient secondary voltage of approximately 11,600V. This transient secondary voltage, now exceeding the DC supply voltage of 10,000V, forces the fault current to decrease rapidly. At $t_2$, the fault current is reduced to below zero. The time interval between $t_1$ and $t_2$ represents the response time of the MCI 20 to a short circuit fault, and is less than 10 microseconds in this design example. The MCI 20 reacts to a short circuit fault even faster than an SSCB due to its lack of MOV energy absorption time. Between $t_2$ and $t_3$, Q1 switches off and on in a pulse width modulation (PWM) mode to maintain a small AC ripple current in the T1 secondary winding 24.

When Q1 is on, the MCI 20 operates in the mode of FIG. 3A, in which both C1 and C2 are discharged through Q1 and Q2. When Q1 is off, the MCI 20 operates in the mode of FIG. 3B, in which only C2 is discharged through D1 and Q2. Q1 only needs to switch between zero and the C1 voltage (maximum of 800V in this design example), and therefore has a much lower voltage rating (i.e., 1.2 kV) than Q2 which needs to hold off the total voltage of C1 and C2 (i.e., 3.3 kV). At $t_3$, the ultrafast disconnect switch SW1 opens under a near zero-current condition, and the MCI 20 operates in the mode of FIG. 3A to discharge capacitors C1 and C2 entirely through the magnetizing inductor of T1, since the secondary winding 24 current is cut off by the opening of SW1.

The voltage across the contact gap of SW1 increases gradually as the secondary voltage of T1 gradually decreases with C1 and C2 being discharged. This is hugely advantageous to prevent arcing and establish the voltage blocking capability in SW1 without requiring an unreasonably fast opening speed. At $t_4$, C1 is fully discharged, and Q1 turns off and D1 turns on to discharge C2. The MCI 20 now operates in the mode of FIG. 3B. At $t_5$, C2 is fully discharged, and Q2 turns off and D2 turns on to dissipate the electromagnetic energy stored in T1. The MCI 20 now operate according to FIG. 3C. At $t_6$, SW1 fully opens to block the DC bus voltage. The fault interruption process is completed.

Figure 4B:
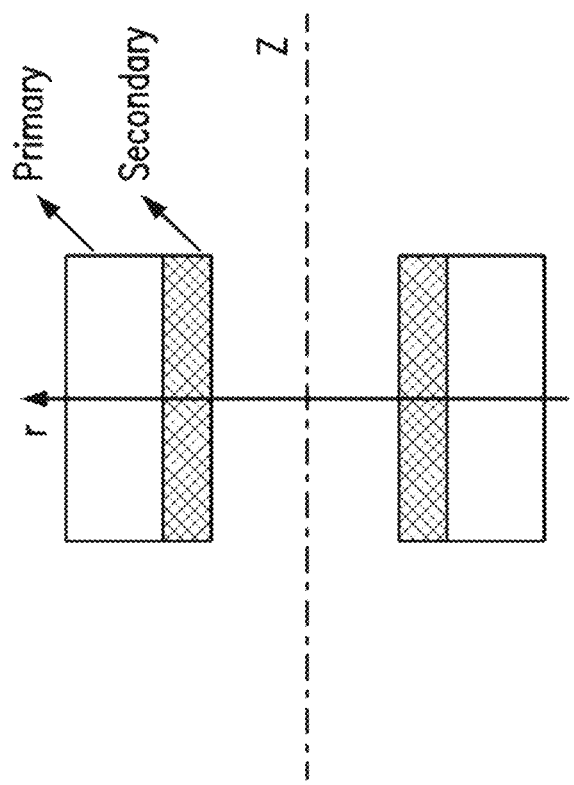
FIGS. 4A-B illustrate a pulse transformer example with high-temperature superconducting secondary winding useful for this invention.
Figure 4A:
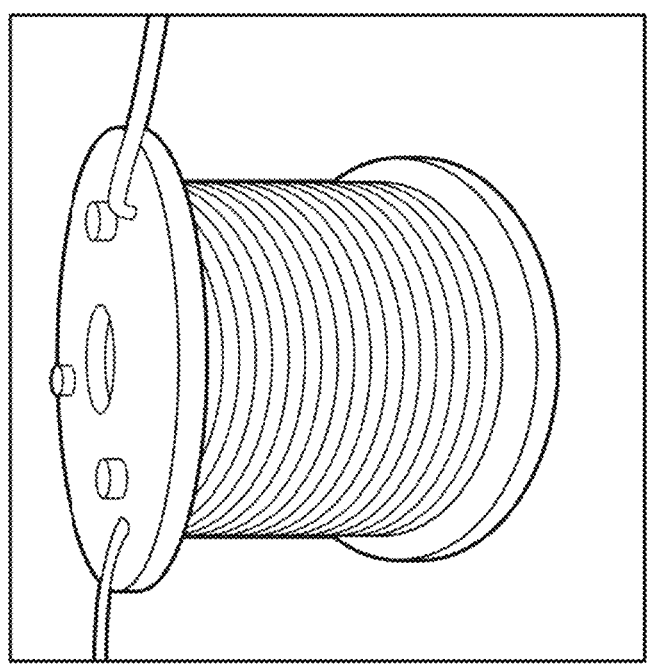

FIGS. 4A-B illustrate transformer examples with high-temperature superconducting windings. The power electronic circuit on the primary side of the transformer (T1 in FIG. 1) controls the discharge of the pre-charged capacitors to generate a transient voltage pulse during the fault interruption process. Thus, the primary winding of the transformer does not carry any current or incur any power loss during normal operation, but conducts a transient current pulse up to a few thousand amperes over a short period of several hundred microseconds. It can be therefore made of conventional copper wires with a significantly lower DC current rating (e.g., 20 A DC rating for a pulse current of 1000 A/1 ms). The secondary winding of the transformer T1, however, carries the main DC current and should be highly conductive to minimize the conduction power loss during normal operation. In some embodiments, high-temperature superconducting (HTS) wires or tapes such as Bi-2223 or BYCO (barium-yttrium-copper oxide) are used for this purpose. A cryogenic environment such as liquid nitrogen immersion is beneficial for an HTS transformer to operate. The turn ratio of the transformer is typically in a range of 2-20, depending on the system voltage requirement and transformer design considerations. A core with a high saturation magnetic flux density including air-core is used due to the very high peak primary current. The transformer can be of solenoidal, toroidal, or pancake type.

Figure 5:
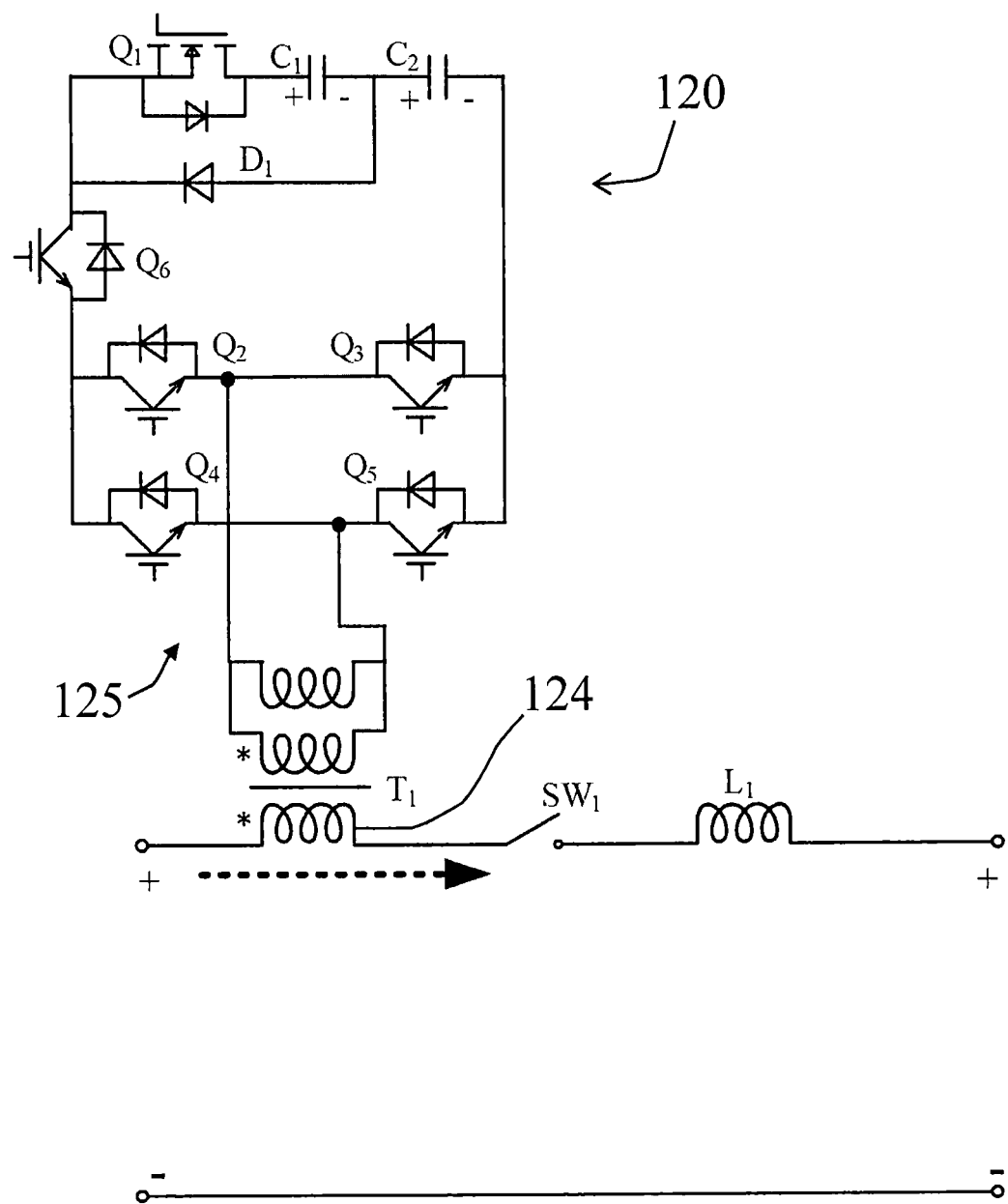
FIG. 5 illustrates a circuit protection architecture according to one embodiment of this invention.
Figure 6:
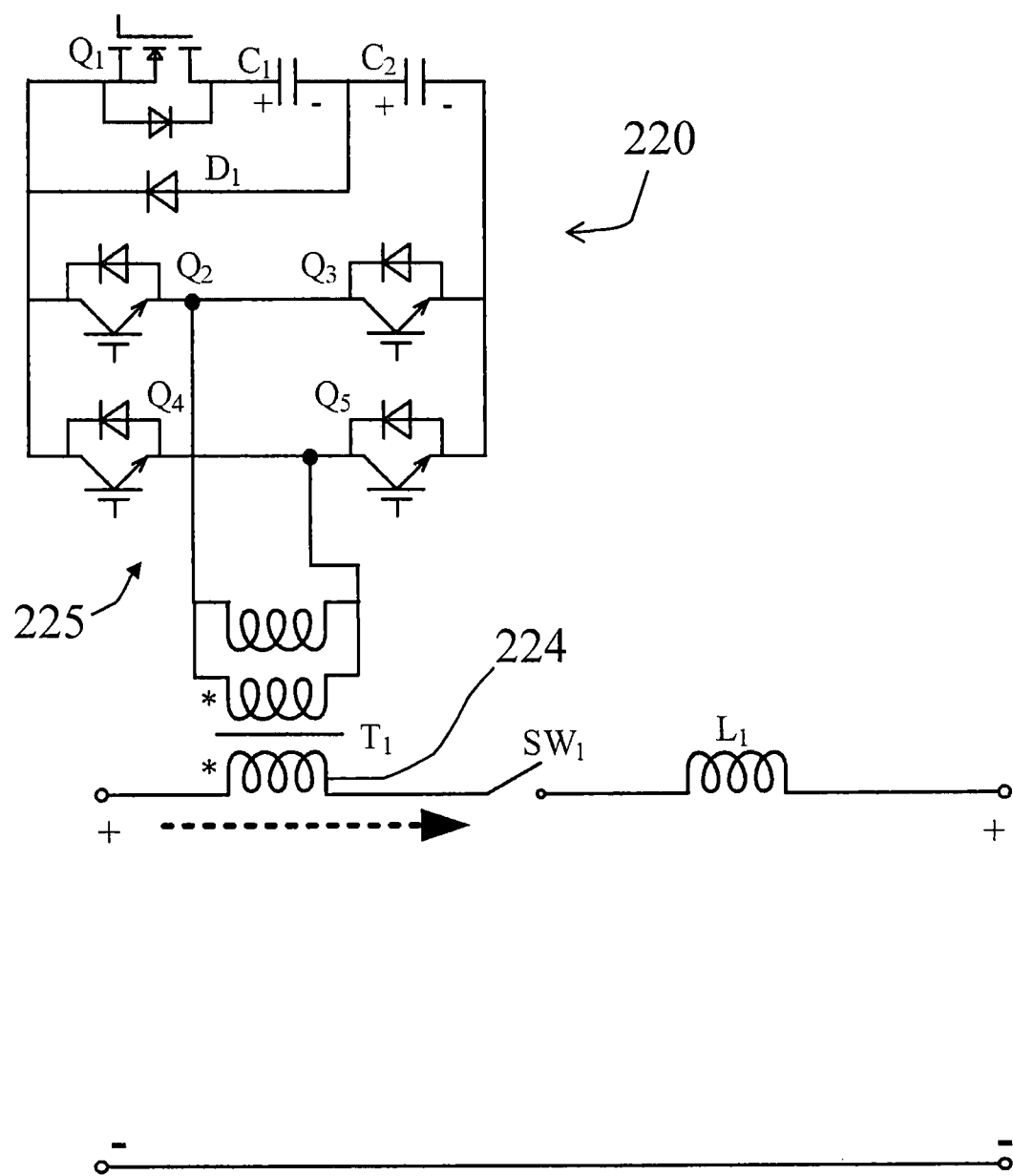
FIG. 6 illustrates a circuit protection architecture according to one embodiment of this invention.

FIG. 5 illustrates a circuit protection architecture incorporating a further embodiment of a bidirectional momentary circuit interrupter 120 of this invention. Four transistors Q2, Q3, Q4, and Q5 are used to form a bridge circuit 125 to accommodate bidirectional current flow in the transformer secondary winding 124. Q6 in FIG. 5 is equivalent to, and plays the same role of, Q2 in FIG. 1. FIG. 6 illustrates an alternative bidirectional circuit protection architecture, where three additional transistors Q3, Q4, and Q5 are used to form a bridge circuit 225 to accommodate bidirectional current flow in the transformer secondary winding 224. Q6 in FIG. 5 is not used in this embodiment, as Q2, Q3, Q4, and Q5 play a more active role than in FIG. 5, making Q6 redundant.

Figure 7:
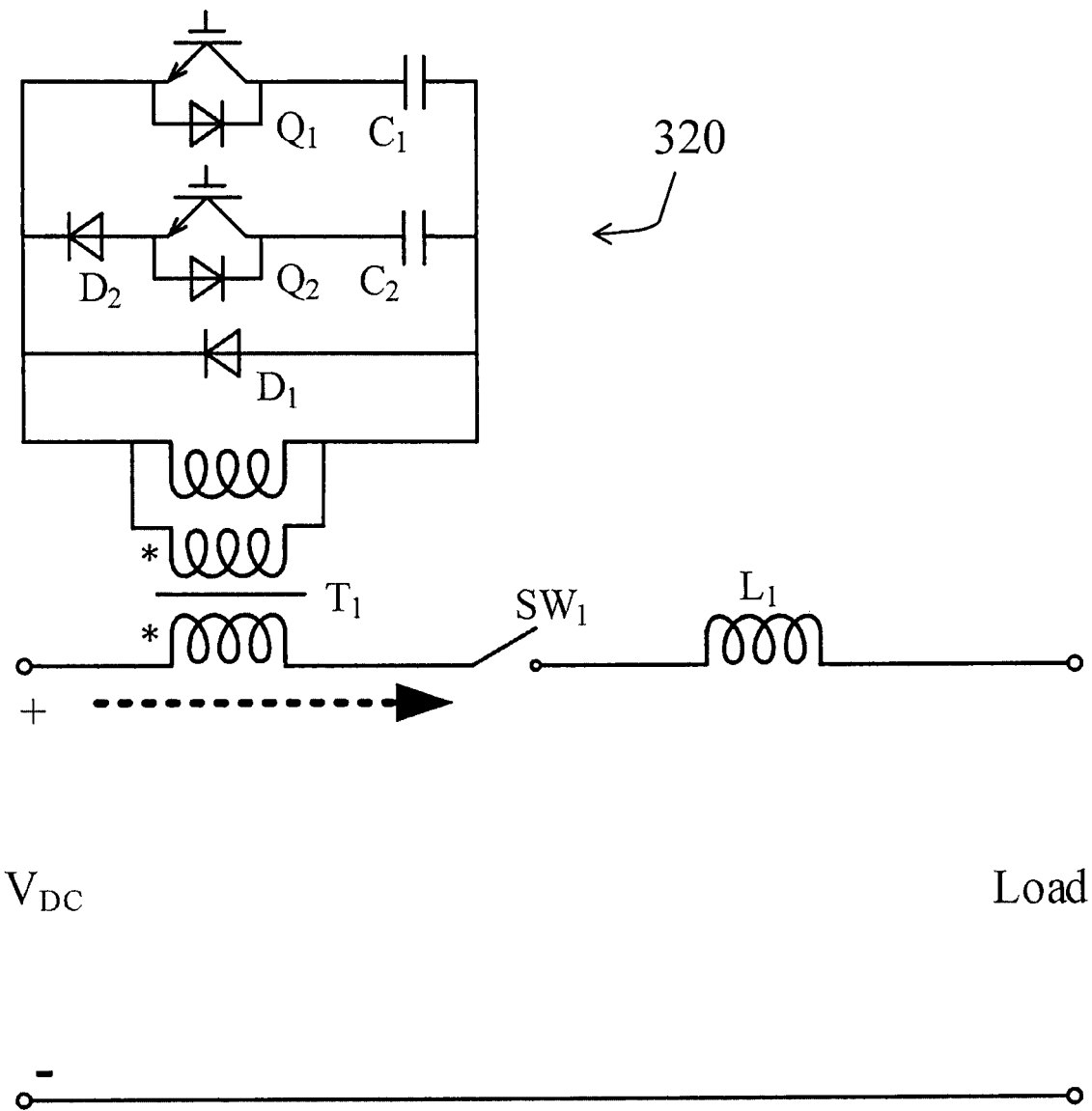
FIG. 7 illustrates a circuit protection architecture according to one embodiment of this invention.

FIG. 7 illustrates a further circuit protection architecture according to embodiments of this invention. C1 and C2 of MCI 320 independently provide high and low voltages in this embodiment. For example, C1 and C2 will be pre-charged to 3,300V and 2,500V, respectively. The voltage rating of Q1 and Q2 will be selected accordingly.

Figure 8:
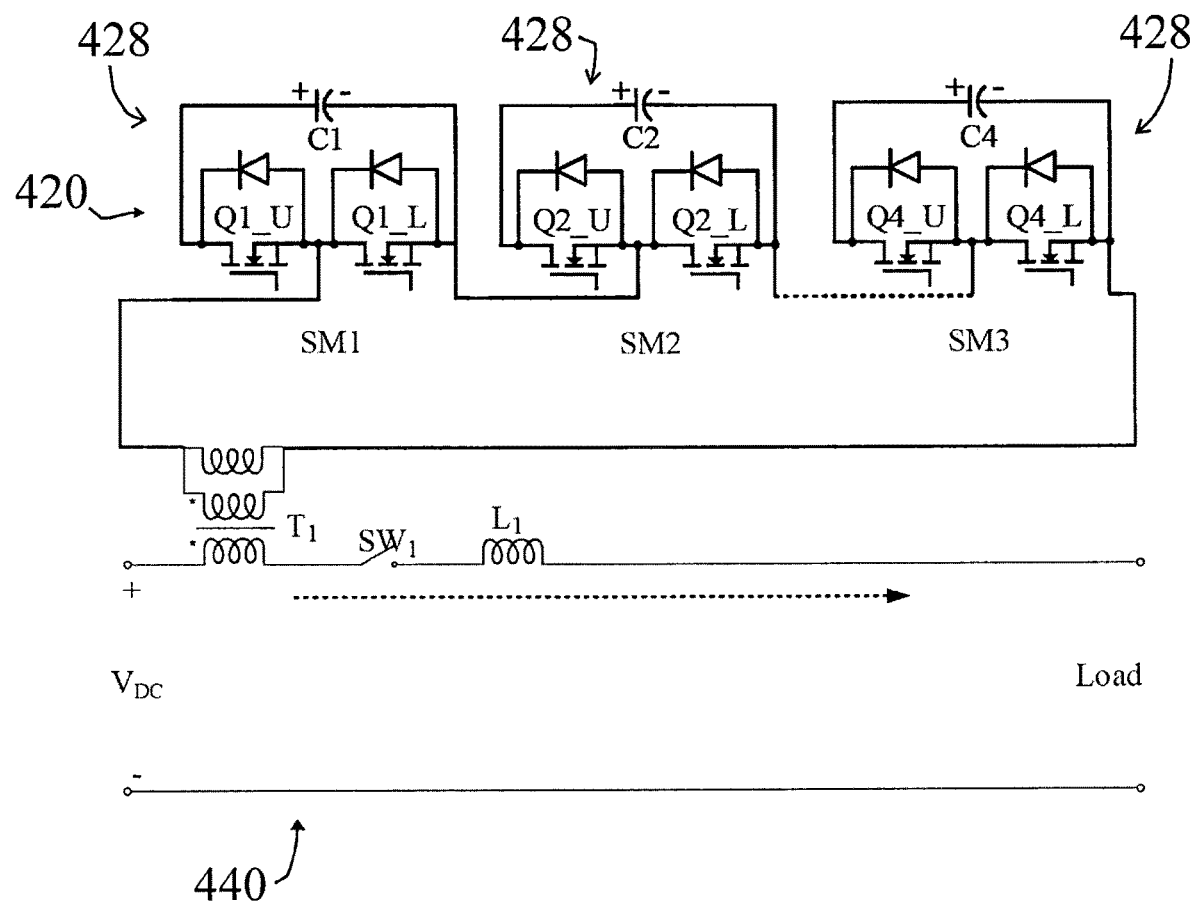
FIG. 8 illustrates a circuit protection architecture according to one embodiment of this invention.

FIG. 8 illustrates another circuit protection architecture of this invention. The primary-side capacitor discharge circuit of the MCI 420 includes a plurality of half-bridge submodules 428, each formed of two IGBTs or MOSFETs ([Q1_U, Q1_L], [Q2_U, Q2_L] . . . , etc.) and one capacitor (C1, C2, . . . , etc.). The injection of the secondary transient voltage and control of the secondary current can be achieved by switching these IGBTs or MOSFETs on and off in a certain sequence. This embodiment accommodates unidirectional current flow in the main power circuit 440.

Figure 9:
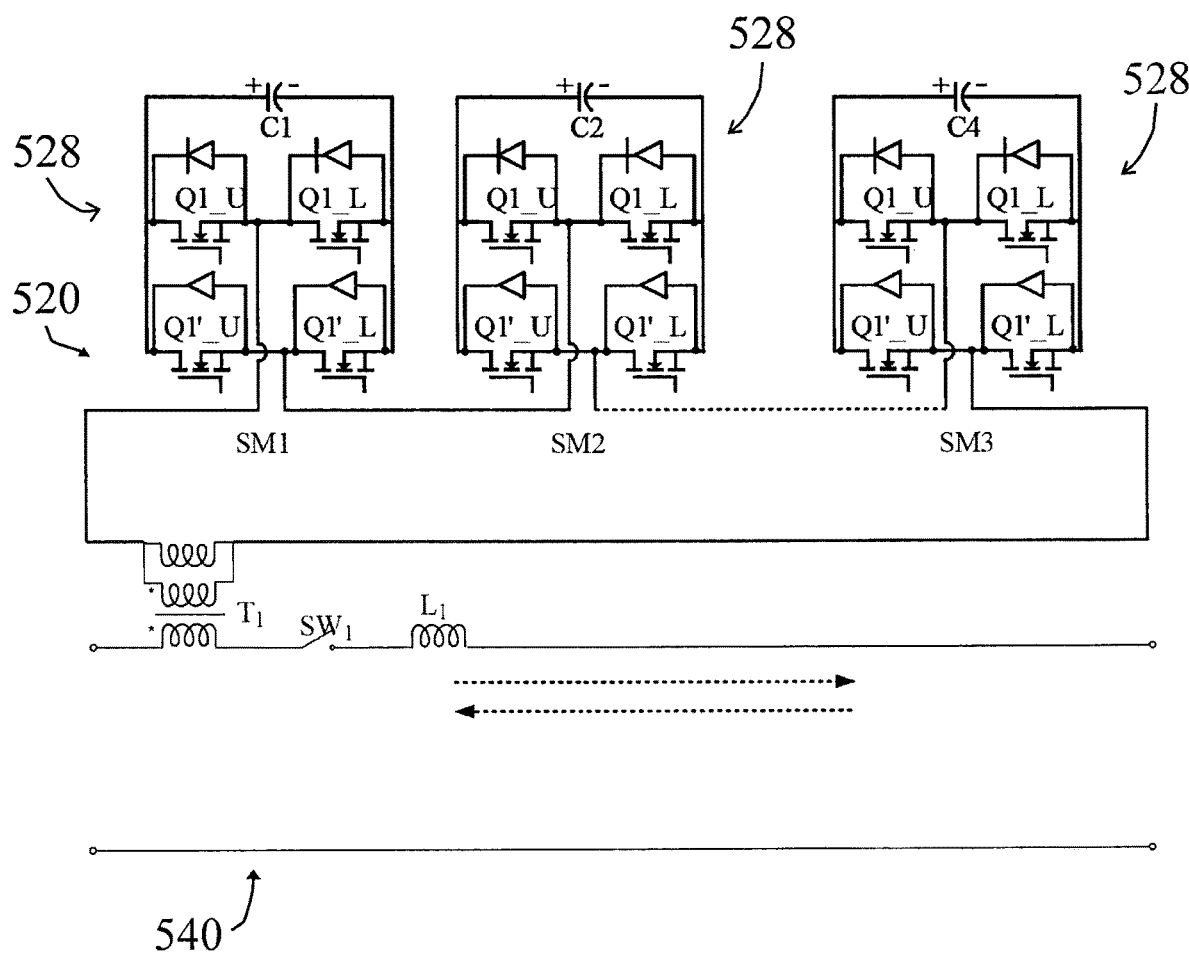
FIG. 9 illustrates a circuit protection architecture according to one embodiment of this invention.

FIG. 9 illustrates yet another circuit protection architecture of this invention. The primary-side capacitor discharge circuit of the MCI 520 includes a plurality of full-bridge submodules 528 each made of four IGBTs or MOSFETs ([Q1_U, Q1_L, Q1'_U, Q1'_L], etc.) and one capacitor (C1, etc.). The injection of the secondary transient voltage and control of the secondary current con be achieved by switching these IGBTs or MOSFETs on and off in a certain sequence. This embodiment accommodates bidirectional current flow in the main power circuit 540.

Figure 10:
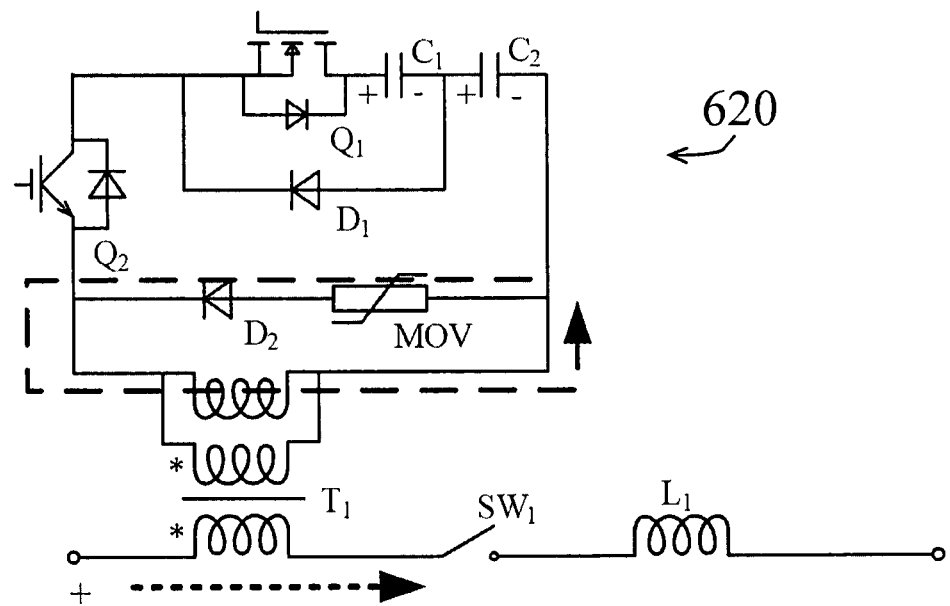
FIG. 10 illustrates a circuit protection architecture according to one embodiment of this invention.

FIG. 10 illustrates still yet another circuit protection architecture of this invention. The MCI 620 is similar to the MCI 20 of FIG. 1, but with an additional metal-oxide-varistor (MOV) used in series of D2 to speed up the dissipation of the residual electromagnetic energy in the transformer T1 after $t_5$ in FIG. 2.

Table 2 below summarizes an exemplary performance comparison of a prior art solid-state circuit breaker (SSCB), a hybrid circuit breaker (HCB), and a momentary circuit interrupter (MCI) of this invention in the design example used in for illustration. The major advantages of the new invention include ultrafast response to a short circuit fault (2-10 times faster than SSCB and more than 50 faster than HCB), significantly reduced overcurrent stress in the power system, and ultralow conduction power loss.

TABLE 2

| Performance Parameter | SSCB (State of the Art) | HCB (State of the Art) | MCI (This Invention) |
| --- | --- | --- | --- |
| Voltage (nominal) | 10 kV | 10 kV | 10 kV |
| Current (nominal) | 100 A | 100 A | 100 A |
| Interrupt Time (time to force fault current to zero) | <100 μs (mainly MOV energy absorption time. Additional time needed to complete galvanic isolation) | <500 μs (mainly mechanical opening and MOV energy absorption time. Additional time needed to complete galvanic isolation) | <10 μs (no MOV time. Additional 100-300 μs needed to complete galvanic isolation) |
| Conduction Loss | >2 kW | <1 W | <1 W |
| Efficiency | >99.8% | >99.9999% | >99.9999% |

It will be appreciated that details of the foregoing embodiments, given for purposes of illustration, are not to be construed as limiting the scope of this invention. Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention, which is defined in the future claims. Further, it is recognized that many embodiments may be conceived that do not achieve all of the advantages of some embodiments, particularly of the preferred embodiments, yet the absence of a particular advantage shall not be construed to necessarily mean that such an embodiment is outside the scope of the present invention.

What is claimed is:

1. A circuit protection apparatus for interrupting a direct-current (DC) fault current in a DC power system, the circuit protection apparatus comprising:

a momentary circuit interrupter including a plurality of capacitors and operable in combination with a DC circuit branch of the DC power system to reduce a DC fault current to a near zero-current condition upon a fault current state in the DC circuit branch, the momentary circuit interrupter further including a pulse transformer connectable to the DC circuit branch and operable to inject a transient voltage from the capacitors to DC circuit branch to reduce the DC fault current to the near zero-current condition, wherein the momentary circuit interrupter operates in a pulse width modulation mode to hold the DC fault current to a near-zero alternating-current (AC) ripple current condition for a period of time.

2. The apparatus of claim 1, wherein the momentary circuit interrupter is operable in a response time of between about 5 microseconds and about 1000 microseconds.

3. The apparatus of claim 1, wherein the pulse transformer comprises a primary winding connected to a power electronic circuit of the momentary circuit interrupter and a secondary winding connected in series with the DC circuit branch.

4. The apparatus of claim 3, further comprising a mechanical switch in series connection with the secondary winding of the pulse transformer.

5. The apparatus of claim 3, wherein the secondary winding of the pulse transformer comprises high-temperature superconducting (HTS) wires or tapes.

6. The apparatus of claim 1, wherein the momentary circuit interrupter comprises at least one current sensor configured to detect the fault current state in the circuit.

7. The apparatus of claim 1, wherein the momentary circuit interrupter comprises a plurality of semiconductor switches disposed between the capacitors and the pulse transformer, wherein the semiconductor switches are operable in the pulse width modulation mode of a plurality of on and off switchings to control the current from the capacitors to the pulse transformer.

8. The apparatus of claim 7, wherein the plurality of semiconductor switches are selected from the group consisting of insulated-gate bipolar transistors (IGBTs), thyristors, and power MOSFETs made of silicon or other semiconductor.

9. The apparatus of claim 7, wherein at least some of the plurality of semiconductor switches form a bridge circuit to accommodate bidirectional current flow in the pulse transformer.

10. A circuit protection apparatus for interrupting a direct-current (DC) fault current in a DC power system, the circuit protection apparatus comprising:

a momentary circuit interrupter operable in combination with a DC circuit branch of the DC power system to reduce a DC fault current to a near zero-current condition upon a fault current state in the DC circuit branch and to operate in a pulse width modulation mode to hold the DC fault current to a near-zero alternating-current (AC) ripple current condition; and a mechanical switch in series connection with the momentary circuit interrupter, the mechanical switch operable to open under the near-zero AC ripple current condition to interrupt the fault current and isolate the DC circuit branch.

11. The apparatus of claim 10, wherein the momentary circuit interrupter operable in a response time of between about 5 microseconds and about 1000 microseconds.

12. The apparatus of claim 10, wherein the momentary circuit interrupter comprises:

a plurality of capacitors operable to discharge during the fault interrupting; and a pulse transformer operable to inject a transient voltage to the DC circuit branch to reduce the DC fault current to the near zero-current condition upon detection of the fault current.

13. The apparatus of claim 12, wherein the pulse transformer comprises a primary winding connected to a power electronic circuit of the momentary circuit interrupter and a secondary winding connected in series with the mechanical switch.

14. The apparatus of claim 10, wherein the momentary circuit interrupter comprises at least one current sensor configured to detect the fault current state in the circuit.

15. The apparatus of claim 12, wherein the momentary circuit interrupter comprises a plurality of semiconductor switches disposed between the capacitors and the pulse transformer, wherein the semiconductor switches are operable in the pulse width modulation mode between a plurality of alternating on and off switches to control the current from the capacitors to the pulse transformer.

16. The apparatus of claim 15, wherein the plurality of semiconductor switches are selected from the group consisting of insulated-gate bipolar transistors (IGBTs), thyristors, and power MOSFETs made of silicon or other semiconductor.

17. The apparatus of claim 16, wherein at least some of the plurality of semiconductor switches form a bridge circuit to accommodate bidirectional current flow in the pulse transformer.

18. A method for interrupting a direct-current (DC) fault current and isolating the fault from a DC circuit, comprising:

detecting a DC fault current;

injecting a transient voltage pulse to the DC circuit to reduce the DC fault current to a near zero-current condition;

injecting alternating-current (AC) ripple current pulses to the DC circuit to hold the DC fault current to a near-zero AC ripple current condition; and opening a mechanical switch of the DC circuit to disconnect a faulty circuit branch under the near-zero AC ripple current condition.

19. The method of claim 18, wherein the injecting step occurs between about 5 microseconds and about 1000 microseconds from the detecting step.

20. The method of claim 18, further comprising sending a trigger signal to the mechanical switch upon receiving the injecting step.

* * * * *